Figure 1:
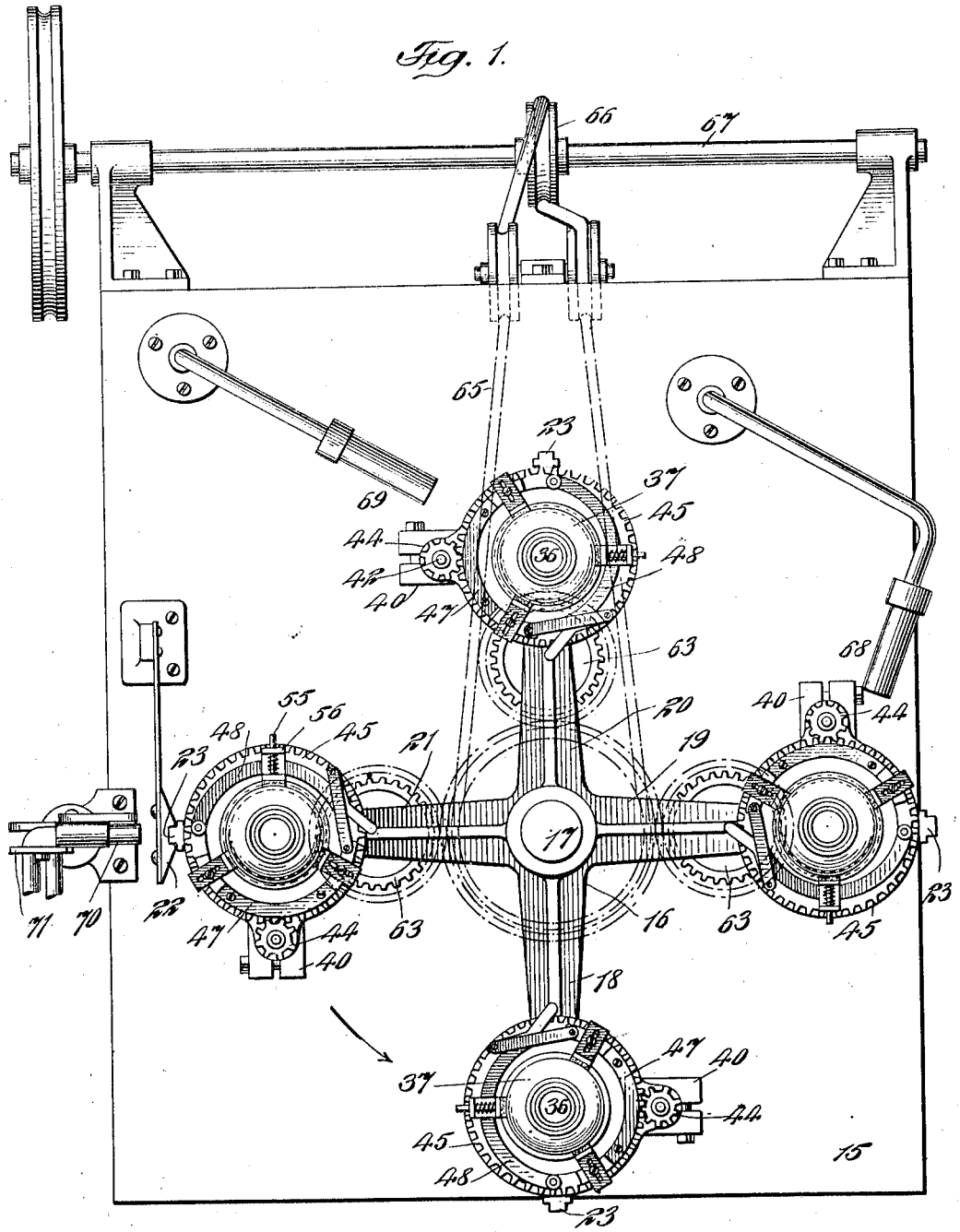

W. R. BURROWS.
MACHINE FOR THE MANUFACTURE OF VACUUM RECEPTACLES.
APPLICATION FILED MAR. 14, 1911.

1,048,456.

Patented Dec. 24, 1912.

4 SHEETS—SHEET 1.

Witnesses:

Inventor
William R. Burrows,
By his Attorney

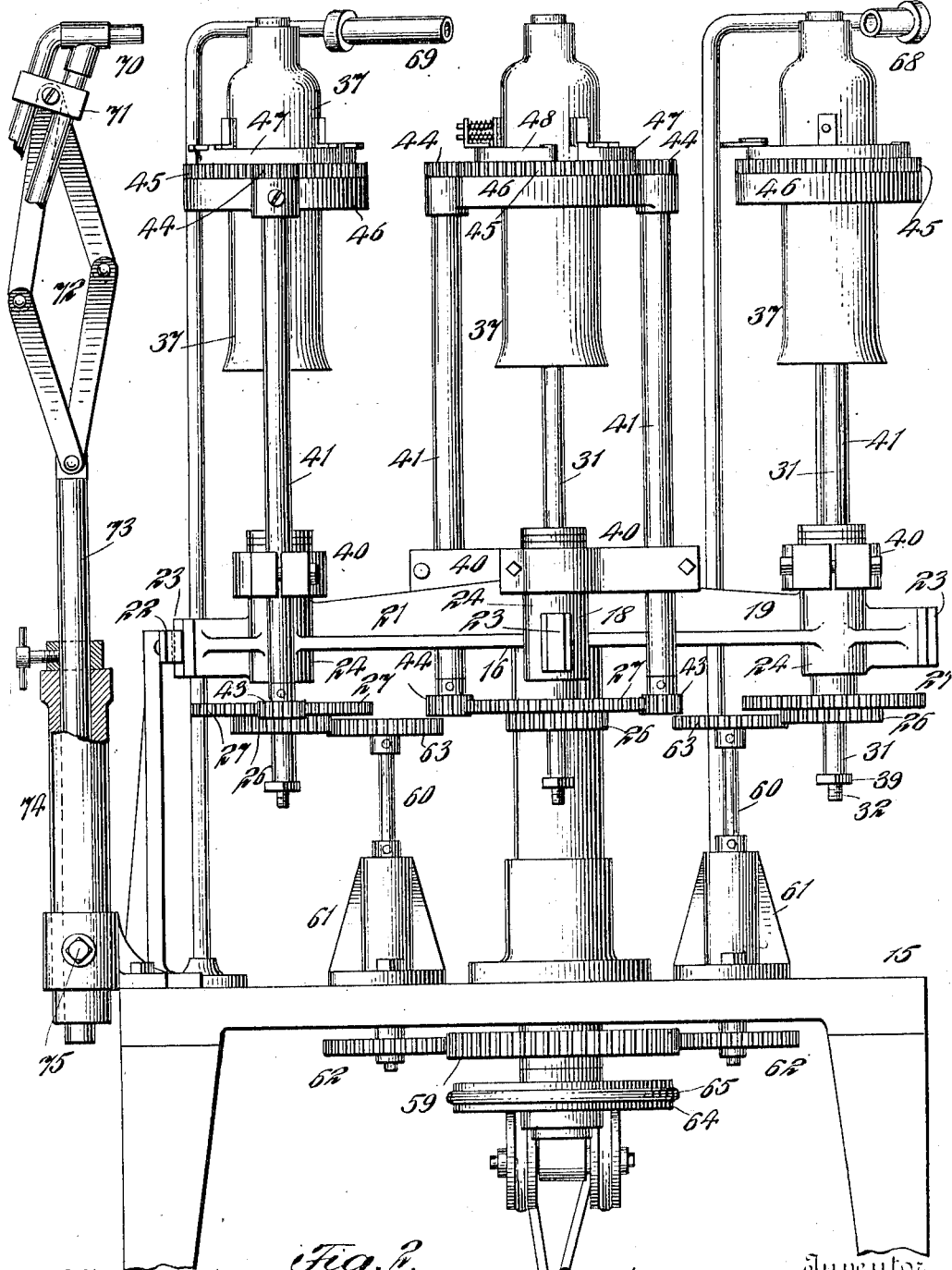

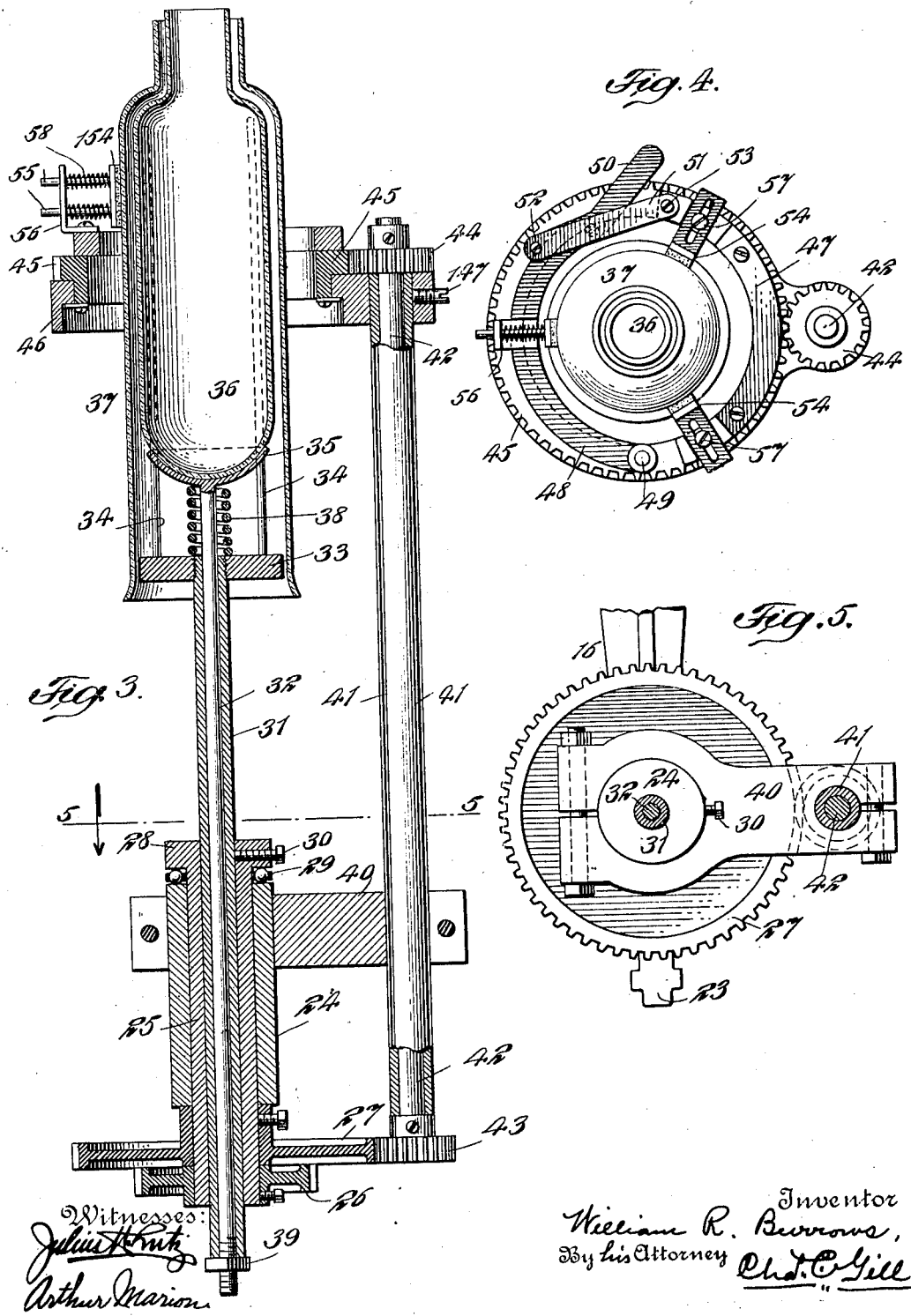

W. R. BURROWS.
MACHINE FOR THE MANUFACTURE OF VACUUM RECEPTACLES.
APPLICATION FILED MAR. 14, 1911.
1,048,456.
Patented Dec. 24, 1912.
4 SHEETS—SHEET 4.
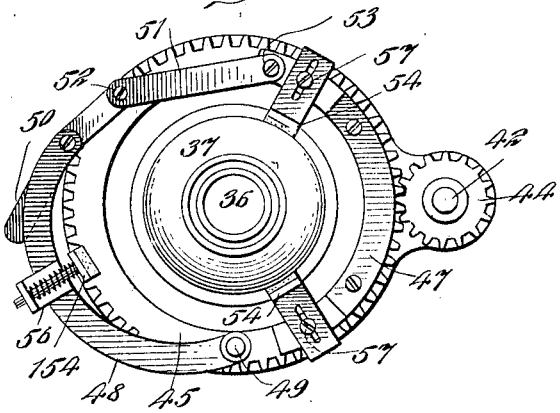
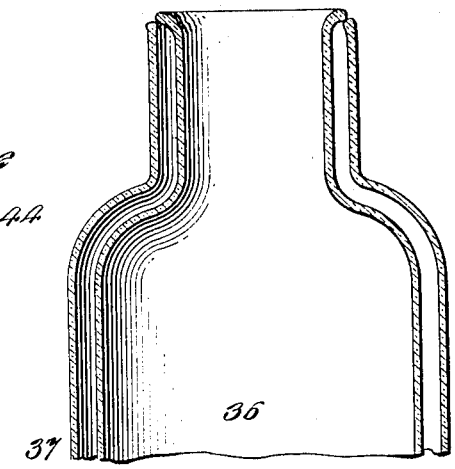
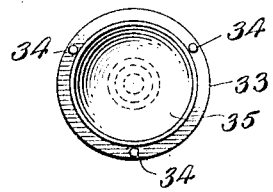
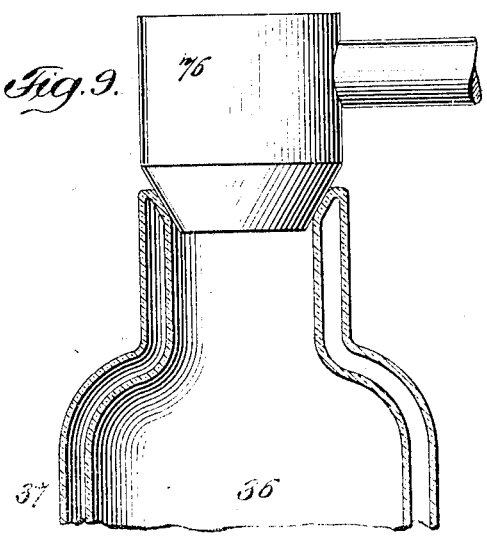
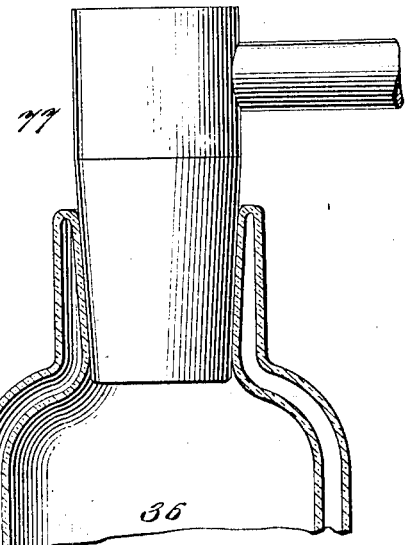

UNITED STATES PATENT OFFICE.

WILLIAM R. BURROWS, OF NEWARK, NEW JERSEY.

MACHINE FOR THE MANUFACTURE OF VACUUM-RECEPTACLES.

1,048,456.  Specification of Letters Patent.  Patented Dec. 24, 1912.

Application filed March 14, 1911.  Serial No. 614,289.

*To all whom it may concern:*

Be it known that I, WILLIAM R. BURROWS, a citizen of the United States, and a resident of Newark, in the county of Essex and State of New Jersey, have invented certain new and useful Improvements in Machines for the Manufacture of Vacuum-Receptacles, of which the following is a specification.

The invention relates to a novel machine for the manufacture of vacuum receptacles of the character comprising an inner receptacle or bottle member and an outer receptacle or bottle member separated by a space from each other and out of contact with each other except at their lip edges where they are fused together, a vacuum being formed in the chamber between the two members. It has been customary in the formation of vacuum receptacles, especially when they are of considerable size, to interpose supporting studs or the like between the lower portions of the members thereof for aiding in enabling the inner or receiving member to resist strains.

My invention pertains more particularly to a novel machine by which the inner and outer receptacle or bottle members may be properly, effectually and with reasonable rapidity seamed together at their lip edges, and the interior of the neck of the inner bottle member formed to receive a stopper. My invention is, therefore, confined to the treatment of the upper ends of the bottle members for their formation, the formation of the lower end of the outer bottle member being left for accomplishment by any suitable means or by a machine which I have specially invented for that purpose and which is shown in an application for Letters Patent for the same filed concurrently herewith bearing Serial Number 614,288.

In its preferred form the machine of my present invention comprises a rotary frame carrying a plurality of chuck mechanisms adapted to support the inner and outer bottle or receptacle members one within the other, and means for rotating said mechanisms when the frame is at its at rest positions adjacent to burners for directing flames against the upper lip edges of the bottle members, said chuck mechanisms being in themselves at rest when said rotary frame is in motion. I preferably provide the rotary frame with four chuck-mechanisms so that at least three pairs of bottle members may, in the at-rest periods of the rotary frame, be rotated in the presence of flames from the gas burners while the fourth chuck-mechanism is at the front of the machine in position for the removal of a finished receptacle and the reception of a pair of members to be carried on the next intermittent movement of the rotary frame to a burner. The chuck mechanisms are of special character and adapted to independently support and simultaneously rotate the bottle members with the inner member accurately located within the outer member. The gas burners which first act upon the bottle members are for heating the glass thereof preparatory to the action on the glass of the final burner at which the important work is performed. Preferably the upper lip edge of the inner bottle member will initially project slightly above the lip edge of the outer bottle member, and during the rotation of said members in the presence of the flame from the final burner, said upwardly projecting portion of the inner member will lap over upon and become fused to the upper edge of the outer bottle member. At this stage of the operation I preferably introduce a tool or tools of inverted truncated cone-shape into the mouth and neck of the inner bottle member so as to effect the proper contour therein for the reception of a stopper such as would be required when the bottle or receptacle is placed in use.

The invention will be fully understood from the detailed description hereinafter presented, reference being had to the accompanying drawings, in which:

Figure 1 is a top plan of a machine constructed in accordance with and embodying the invention; Fig. 2 is a front view, partly in section and partly broken away, of the same; Fig. 3 is a vertical section, on a larger scale than Figs. 1 and 2, of one of the rotary chucks and its coöperative mechanism for receiving and holding the inner and outer bottle-blanks preparatory to their union; Fig. 4 is a top view of the same; Fig. 5 is a horizontal section of the same on the dotted line 5—5 of Fig. 3; Fig. 6 is a detached top view, corresponding with Fig. 4, of one of the rotary frames or chucks but showing the bottle-blank clamping devices in their releasing or initial condition ready to permit the removal of or receive the bottle-blanks; Fig. 7 is a detached top view of the supporting frame for the inner bottle-blank; Fig. 8 is an enlarged vertical section through the upper portion of the bottle-blanks after they have for a time been subjected to rotation in the presence of a flame directed against their lip edges for softening and welding the same together; Fig. 9 is a like view showing a further stage in the formation of the upper end of the bottle, a hand tool or reamer being shown as inserted within the outer portion of the end of the inner member of the bottle, and Fig. 10 is a like view showing the finishing stage in the formation of the upper end of the bottle, a hand tool or reamer having a long tapered body portion being shown as within the inner member of the bottle for giving final form thereto.

In the drawings, 15 designates the table or bed-plate of the machine, 16 a horizontal rotary frame supported above said bed-plate, and 17 a vertical shaft having mounted upon its upper end said frame 16. The frame 16 is shown as a spider-frame comprising four equally spaced-apart radial arms numbered, respectively, 18, 19, 20, 21, and said frame is to be moved by hand, being given a one-quarter turn at each movement and yieldingly locked at the end of each movement by a spring latch 22 arranged to engage a shoulder 23 on the outer end of the said arms as the latter are moved against it. While each arm of the frame 16 is formed with a shoulder 23, one latch 22 is sufficient to hold the entire frame stationary during its at-rest periods.

Each arm of the frame 16 is formed near its outer end with a vertical bearing sleeve 24 containing a rotary sleeve 25 (Fig. 3) upon whose lower end are secured the gear wheels 26, 27 and whose upper end is formed with an annular shoulder 28 and supported on ball-bearings 29 at the upper end of the sleeve 24. Each sleeve 25 has secured within it, by a screw 30, a tubular rod 31 containing within it a rod 32 and having secured on its upper end a disk or plate 33 carrying a series, say three, vertical equally spaced-apart rods 34 which form, with the cup 35, a frame to hold the inner bottle or bottle-blank 36 properly within the outer bottle-blank 37 during the welding or fusing of the lip edges of said blanks together in the operation of completing the formation of the upper end of the bottle. The cup 35 is concaved to snugly receive the lower end of the inner bottle member 36 and is formed or secured on the upper end of the rod 32. A spring 38 encompasses the rod 32 between the cup 35 and disk 33 and affords an adjustable seat for said cup. The lower end of the rod 32 is threaded to receive a nut 39 by which the action of the spring 38 is restrained and which may be used to draw the rod 32 downwardly or release it somewhat to move upwardly in assuring a proper initial relation of the upper edges of the bottle blanks or members to each other.

Each sleeve 24 of each arm of the frame 16 has clamped on it a horizontal bar 40 (Fig. 5) standing preferably at right angles to the frame-arm and having secured to its outer end a vertical tubular rod 41 within which is mounted a vertical shaft 42 carrying at its lower end a pinion wheel 43 in constant mesh with the aforesaid gear-wheel 27 (Fig. 3) and at its upper end a pinion wheel 44 in constant mesh with a ring gear wheel 45, which is rotatably mounted in a horizontal open frame 46 supported from the tubular rod 41 and secured thereto by a set screw 147. The ring gear wheel 45 and frame 46 concentrically encircle the bottle members 36, 37 and are above the gear wheel 27. The inner bottle-member 36 is held by the cup 35 and rods 34 and the outer bottle-member 37, which has an open lower end, by a clamping mechanism secured to the ring gear wheel 45 and comprising (Figs. 4 and 6) a stationary arc-shaped bar 47, an arc-shaped bar 48 pivoted at one end, as at 49, and having a handle 50 medially pivoted thereto at the other end, a link 51 pivoted at one end to the inner end of said handle (at 52, Fig. 6) and at the other end, at 53, at a fixed point, and a series of preferably two bracket-bars or plates 54 and one bar or plate 154 faced preferably with asbestos, the bracket bars or plates 54 being rendered radially adjustable by means of slots in their horizontal members and set-screws 57, and the bar or plate 154 being carried by rods 55 mounted in the vertical member of a bracket 56 which is secured to the pivoted arc-shaped bar 48. Upon the rods 55 between the vertical member of the bracket 56 and the plate or bar 154 are coiled springs 58 to yieldingly exert their tension against said plate or bar and gently, though firmly, press the asbestos pad carried thereby against the outer bottle-member 37.

In Fig. 6 I show the clamping mechanism carried by the ring gear wheel 45 in its open condition ready to receive or release the bottle-members, while in Fig. 4 said mechanism is shown in its closed condition engaging the outer bottle-member. When the handle 50 is turned outwardly to the left, looking at Fig. 4, it will turn the bar 48 outwardly to the position shown in Fig. 6 and thereby release the bottle-member 37, and when the movement of said handle is reversed and said handle restored to the position shown in Fig. 4 it will cause the clamping devices to engage said bottle member, said handle then by reason of its deflected inner end carrying the pivot point 52 outwardly beyond a center line through the pivot point 53 and the pivotal point of said handle with the bar 48 locking the clamping devices in their closed position.

Each arm of the frame 16 is equipped with the mechanism I have just described comprising (Fig. 3) the bearing sleeve 24, rotary sleeve 25, gear-wheels 26, 27, rods 31, 32, disk 33, rods 34, cup-support 35, spring 38, bar 40, rods 41, 42, pinion wheels 43, 44, ring gear wheel 45, open frame 46 and the clamping devices secured on said ring gear wheel, and said mechanism as a whole may be conveniently considered as a rotary chuck mechanism for vertically holding and rotating the bottle-members. There will be no rotation of the chuck mechanism and bottle-members, however, except when the gear wheel 26 of a chuck mechanism is in engagement with a driving gear wheel of the driving mechanism. When the frame 16 is being moved on its quarter-turns all the chuck-mechanisms are in themselves at rest, and in the machine presented herein when the frame 16 is at its at-rest periods all of the chuck-mechanisms will be in rotation with the exception of the one then at the front of the machine, that one being idle to permit the attendant to withdraw therefrom the bottle-members then fused together at their lip edges and insert therein bottle-blanks or members 36, 37 to have their lip edges fused together during the subsequent operation of the machine. The mechanisms for driving the chuck-mechanisms, with the exception of the front one of said mechanisms, at the at-rest periods of the frame 16 may be understood from Figs. 1 and 2, and comprise a main driving gear wheel 59 preferably located below the bed-plate or table 15, a series of three vertical shafts 60 extending through the bed-plate 15 and mounted in vertical bearings 61 secured upon said bed-plate, gear-wheels 62 secured on the lower ends of said shafts 60 and always in mesh with said gear-wheel 59 and gear wheels 63 secured upon the upper ends of said shafts 60, said shafts 60 and gear-wheels 63 being so positioned with relation to the chuck mechanisms carried by the frame 16, that when said frame is moved to an at rest position, such as illustrated in Fig. 1, the gear-wheels 26 thereof will move into engagement with the gear-wheels 63 and be rotated thereby. There are four chuck mechanisms carried by the frame 16, but I provide only three shafts 60 carrying gear-wheels 63, and hence when the frame 16 is moved to an at rest position, the two side and one rear chuck-mechanisms will be set in rotation from the gear-wheels 63, while the front chuck-mechanism will remain idle, so that as hereinbefore explained the operator may withdraw the bottle therefrom and insert bottle members thereto. The gear-wheels 63 have a constant rotation, but have no influence on the chuck mechanisms carried by the frame 16, except when said frame is at an at rest position. The gear-wheel 59 drives the gear-wheels 62, shafts 60 and gear-wheels 63 and it is driven from a pulley-wheel 64 around which a belt 65 leading from a pulley-wheel 66 on the main driving shaft 67 passes.

The rotation of the gear-wheel 26 of a chuck mechanism from a gear-wheel 63 results in the rotation of the sleeve 25 and parts connected therewith and actuated therefrom. The rotation of the sleeve 25 results in the tubular rod 31, to which it is connected, being rotated, and since the disk 33 and rods 34 are connected with the tubular rod 31, they likewise will be rotated. The rod 32 is clamped to the rod 31 by the tension of the spring 38 and application of the nut 39, and hence it and the disk or plate 35 and bottle-member 36 will rotate with the rotation of the tubular rod 31, causing the bottle-member 36 to turn on its vertical axis. The gear-wheel 27 is secured to the sleeve 25, as shown in Fig. 3, and hence when said sleeve is rotated, said gear-wheel 27 will also rotate and impart rotary movement to the pinion-wheel 43, rod 42 and pinion-wheel 44, and at this time the wheel 44 will impart motion to the ring gear-wheel 45, causing the latter to rotate in time with the rotation of the rods 31, 32 and impart through the clamping mechanisms carried by it, rotary movement to the outer bottle member 37, the latter turning on its vertical axis correspondingly with the movement of the inner bottle member 36. When therefore the frame 16 is at an at rest position three of the chuck-mechanisms just hereinbefore described, such mechanism being duplicated for each arm of the frame 16, will be in motion or driven by the gear wheels 63, while the other chuck-mechanism will stand idle to permit the removal of one bottle and the insertion of two bottle blanks therein for treatment.

The bottle blanks or members 36, 37 will initially have the relation to each other illustrated in Fig. 3, said inner member being separated from the outer member by a space and the upper edge of the neck or lip of the inner member being extended slightly higher than the upper edge or lip of the outer bottle-member. The fusing or welding of the upper or lip-edges of the bottle-members requires of course the softening and melting of said edges and the engagement of the edge of the inner bottle-member with that of the outer bottle-member, and to effect this softening and melting of the glass, I provide adjacent to the right hand and rear chuck-mechanisms at their at rest positions, looking at Fig. 1, gas-burners 68, 69 for directing flames against the upper edges of the bottle-members held in the at rest periods of the frame 16 adjacent to said burners. While the burners 68, 69 are directing their flames against the upper edges of the bottle-members, the chuck-mechanisms holding said members are in rotation, as hereinbefore explained, and hence the flames are enabled to act against said edges in a uniform manner and effect the heating of the glass thereat. At the left hand side of the machine, looking at Fig. 1, I provide a Bunsen burner 70 in position to direct its flame strongly against the upper edges of the bottle-members for the purpose of softening and melting the edges thereof and causing said edges to fuse together. The burner 70 is held by a bracket 71 upon the upper end of a set of toggle levers 72 which are pivoted at their lower ends to a rod 73 held in a vertical sleeve 74, said rod being adjustable vertically in said sleeve and being rigidly secured in any adjusted position by means of a set-screw 75. The levers 72 also permit vertical adjustment of the burner 70, and the sleeve 74 and nut 75 also permit angular adjustment of the rod 73, with the result that with the various adjustments permitted, the operator may manipulate or direct the flame from the burner 70 to secure the highest efficiency therefrom in its action on the glass. The edges of the bottle-members become heated at the burners 68, 69 preparatory to their final treatment at the burner 70, and one of the first effects attained at the burner 70 is that the upwardly extending edge portion of the inner bottle member 36 will lap upon the upper edges of the outer bottle member, as shown in Fig. 8, and then that the adjoining edges of said members will melt and become fused together. While the bottle-members are being acted on by the flame from the burner 70, I impart the proper shape to the neck of the bottle, more particularly the bore of the neck of the inner member by means of tools 76, 77, as shown in Figs. 9 and 10, the tool 76 having a lower truncated cone section with rather abrupt surfaces and being used to taper downwardly and inwardly the upper inner edges of the bottle-neck, the action being against the neck-portion of the inner member 36. After the tool 76 has been used to the extent indicated in Fig. 9, it is withdrawn and the tool 77 having a long gently-tapered body portion is applied to the inner bottle-member, said tapered portion of the tool being inserted within the neck of the inner member and imparting the requisite shape and character thereto to enable said member to properly receive and retain a cork for closing the bottle when the latter is in use.

While one bottle is being treated at the burner 70 to bring it to the condition illustrated in Fig. 10, the members for two other bottles are being properly heated at the burners 68, 69 preparatory to their treatment when they reach the burner 70 for converting them into the condition shown in Fig. 10, in which it will be seen that the bottle-members have been properly united and shaped to their final condition, so far as the upper end of the bottle is concerned. After each bottle has received its finishing treatment and been completed to the extent represented in Fig. 10, the operator will manually give the frame 16 a quarter-turn so as to carry the bottle-members which may be in the front chuck mechanism to position in line with the burner 68, the bottle-members which were adjacent to the burner 68 to the burner 69, the bottle members which were adjacent to the burner 69 to position adjacent to the burner 70 for final treatment, and the bottle which was completed while adjacent to the burner 70 to the front of the machine for removal and such further treatment as may be required for closing the lower end or skirt of the bottle-member 37 below the bottle-member 36 so as to complete the entire bottle.

The present invention is not limited to any means for closing the lower end or skirt of the outer bottle member below the inner bottle member, but I recommend for this purpose the use of a machine which I have specially designed to create the lower end of the bottle member and which has been made the subject of a separate application for Letters Patent filed herewith bearing Serial No. 614,288. Upon the removal of the bottle completed to the extent shown in Fig. 10 from the front chuck mechanism, another pair of bottle-members 36, 37 will be introduced to said chuck mechanism, the member 36 being set within the rods 34 and upon the seat 35, and the member 37 being introduced over the member 36 and supported upon the upper ends of the rods 34. The rods 34 confine and aid in holding and supporting the member 36 and they support the outer member 37 and at the same time said rods perform the important duty of maintaining the member 36 concentrically within the member 37, so that there will be a uniform space between said members. The rods 34 are preferably in diameter nearly equal to the horizontal width of the space between the members 36, 37. In introducing the bottle members to the machine it will sometimes be found that slight variations therein in the shape of their upper portions will necessitate a vertical adjustment of the member 36 with respect to the member 37, so that the proper space may be left between the upper or shoulder portions of said members, and this adjustment may be attained by turning the nut 39 so as to draw the rod 32 and seat 35 downwardly or permit the same to move slightly upwardly. When the bottle members are introduced to the chuck mechanism the operator will always observe whether there a proper space present between the upper shoulder portions thereof and if this space should not be present then he should adjust the inner bottle member with respect thereto. In the subjection of the upper edges of the bottle members to the final burner 70 I so direct the heat from said burner that the edge of the inner member becomes somewhat more greatly heated than the edge of the outer member and as soon as the edge of the inner member has softened sufficiently, I touch the same with a carbon tool, such as 76, for causing it to lap over upon the edge of the outer bottle member, after which the action of the flame serves to fuse said edges together.

I do not limit my invention to the details of construction hereinbefore described, since the same may be variously modified within the scope of the claims.

What I claim as my invention and desire to secure by Letters Patent, is:

1. In a machine for securing the union of the lip edges of separated inner and outer members of a vacuum receptacle, said inner member having a closed lower end and said outer member an open lower end, a rotary chuck mechanism for supporting and rotating said members in the presence of a flame directed against said lip edges comprising means to transversely clasp said outer member, means to support said inner member from its lower end, and means extending between said outer and inner members to center one within the other.

2. In a machine for securing the union of the lip edges of separated inner and outer members of a vacuum receptacle, said inner member having a closed lower end and said outer member an open lower end, a rotary chuck mechanism for supporting and rotating said members in the presence of a flame directed against said lip edges comprising means to transversely clasp said outer member, means to support said inner member from its lower end, means to adjust the initial relation of said lip edges with respect to each other, and means extending between said outer and inner members to center one within the other.

3. In a machine for securing the union of the lip edges of separated inner and outer members of a vacuum receptacle, said inner member having a closed lower end and said outer member an open lower end, a rotary chuck mechanism for supporting and rotating said members in the presence of a flame directed against said lip edges comprising means to transversely clasp said outer member, means to support said inner member from its closed lower end, and rods extending between said outer and inner members to the upper inwardly turned top of the body portion of said outer member to center one member within the other and aid in supporting the outer member.

4. In a machine for securing the union of the lip edges of the inner and outer members of a vacuum receptacle, a chuck mechanism comprising rotary clamping means for engaging the outer receptacle-member, supporting and confining means for holding the inner receptacle-member concentrically within said outer member, and means for simultaneously rotating said clamping and supporting and confining means and said members, combined with a burner for directing a flame against said edges during such rotation, one of said edges being initially beyond the other so as to be lapped over upon said other during the application of heat from said burner by the application of a suitable tool thereto.

5. In a machine for securing the union of the lip edges of the inner and outer members of a vacuum receptacle, a chuck mechanism comprising a ring gear wheel adapted to receive within it the outer receptacle-member and having releasable clamping means for engaging the side surfaces of the same, a frame supporting said ring gear wheel, a support for the inner receptacle-member, a rod constituting a part of said support, a tubular rod receiving said support-rod, a disk on said tubular rod having vertical members engaging the sides of and confining said inner receptacle-member, a spring on said support-rod between said support and said disk, a sleeve on and connected with said tubular-rod, a gear-wheel on and connected with said sleeve, means for imparting rotary motion to said gear wheel, and a rod having pinions in mesh with said gear wheel and said ring gear wheel for assuring simultaneous rotation of the parts engaging the inner and outer receptacle-members, combined with a burner for directing a flame against the lip edges of said receptacle members during such rotation.

6. In a machine for securing the union of the lip edges of the inner and outer members of a vacuum receptacle, a chuck mechanism comprising a ring gear wheel adapted to receive within it the outer receptacle-member and having releasable clamping means for engaging the side surfaces of the same, a frame supporting said ring gear wheel, a support for the inner receptacle-member, a rod constituting a part of said support, a tubular rod receiving said support-rod, a disk on said tubular rod having vertical members engaging the sides of and confining said inner receptacle-member, a spring on said support-rod between said support and said disk, a sleeve on and connected with said tubular-rod, a gear-wheel on and connected with said sleeve, means for imparting rotary motion to said gear wheel, and a rod having pinions in mesh with said gear wheel and said ring gear wheel for assuring simultaneous rotation of the parts engaging the inner and outer receptacle-members, combined with a burner for directing a flame against the lip edges of said receptacle members during such rotation.

7. In a machine for securing the union of the lip edges of the inner and outer members of a vacuum receptacle, clamping means engaging the sides of said outer member, supporting and confining means engaging the bottom and sides of said inner member and holding the same concentrically within the outer member, means for simultaneously rotating said clamping and supporting means and said members, and a burner for directing a flame against the lip edges of said members to effect during such rotation their union, the lip edge of the inner member being initially supported above the edge of the outer member and said burner being adapted to direct its flame against the exterior of said edges, whereby during the rotation of the members the edge of the inner member may on the application thereto of a suitable tool be caused to lap over upon the edge of the outer member, combined with means for adjusting the inner member longitudinally with relation to the outer member.

8. In a machine for securing the union of the lip-edges of the inner and outer members of a vacuum receptacle, a frame mounted for manual rotary intermittent movements and having a plurality of chuck-mechanisms each adapted to support receptacle-members, a yielding latch for locking said frame at the end of each of its movements, means for imparting rotary movement to said mechanisms and the receptacle-members held by them when said frame is at its at-rest positions, and burners mounted to direct their flames against said lip-edges during such rotations, the final burner being adapted to effect sufficient melting of said edges for their union, and said chuck-mechanisms being adapted to support the inner receptacle-members with their lip-edges initially projected beyond the lip-edges of the outer receptacle-members so as to assure the lapping of the same over thereupon at said final burner.

9. In a machine for securing the union of the lip-edges of the inner and outer members of a vacuum receptacle, a frame mounted for manual rotary intermittent movements and having a plurality of chuck mechanisms each adapted to support receptacle-members, a yielding latch for locking said frame at the end of each of its movements, means for imparting rotary movement to said mechanisms and the receptacle-members held by them when said frame is at its at-rest positions, and burners mounted to direct their flames against said lip-edges during such rotations, the final burner being adapted to effect sufficient melting of said edges for their union, and said chuck-mechanisms being adapted to support the inner receptacle-members with their lip-edges initially projected beyond the lip-edges of the outer receptacle-members so as to assure the lapping of the same over thereupon at said final burner.

10. In a machine for securing the union of the lip-edges of the inner and outer members of a vacuum receptacle, a rotary frame having a plurality of rotary chuck mechanisms each adapted to support receptacle-members vertically and having a driving gear-wheel at its lower end, a driving mechanism having gear wheels positioned to engage and drive the gear wheels of said chuck mechanisms at the at-rest positions of said rotary frame, and burners mounted to direct their flames against said lip-edges during the rotation of the chuck-mechanisms and the receptacle-members carried by them, the final burner being adapted to effect sufficient melting of said edges for their union.

Signed at New York, in the county of New York and State of New York this 13th day of March A. D. 1911.

WILLIAM R. BURROWS.

Witnesses:
CHAS. C. GILL,
ARTHUR MARION.